US006275318B1

(12) United States Patent
Kamikubo et al.

(10) Patent No.: US 6,275,318 B1
(45) Date of Patent: Aug. 14, 2001

(54) LINEAR IMAGING LENS ELEMENT FOR A SCANNING OPTICAL SYSTEM

(75) Inventors: Junji Kamikubo; Daisuke Koreeda, both of Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,297

(22) Filed: Jun. 24, 1999

(30) Foreign Application Priority Data

Jun. 26, 1998 (JP) .................................................. 10-179910

(51) Int. Cl.[7] .................................................... G02B 26/08
(52) U.S. Cl. ............................................. 359/196; 359/711
(58) Field of Search .................................... 359/196, 708, 359/711

(56) References Cited

U.S. PATENT DOCUMENTS

| 5,255,113 | * | 10/1993 | Yoshikawa et al. | ................. 359/196 |
| 5,453,870 | | 9/1995 | Iima . | |
| 5,541,760 | | 7/1996 | Iizuka . | |
| 5,648,865 | | 7/1997 | Iizuka . | |
| 6,052,236 | * | 4/2000 | Nakasuji et al. | ..................... 359/711 |

FOREIGN PATENT DOCUMENTS 9258099    10/1997  (JP) .

* cited by examiner

*Primary Examiner*—Darren Schuberg
(74) *Attorney, Agent, or Firm*—Greenblum & Bernstein, P.L.C.

(57) ABSTRACT

A linear imaging lens element for a scanning optical system in which light flux from a light source is formed as a linear image in the vicinity of a reflection surface of a light deflector includes a progressive power toric-aspherical surface being provided on either a surface facing the light source or on a surface facing the deflector. Cross-sectional configurations of the progressive power toric-aspherical surface, which are parallel with the plane including the optical axis and being perpendicular to the linear image, are made to be a circular arc, and the radius of curvature of each circular arc cross-sectional configuration is independently determined from the cross-sectional configuration lain on the plane which includes the optical axis and is parallel with the linear image.

7 Claims, 13 Drawing Sheets

XY Cross-section

Fig. 5

XZ Cross-section

Fig. 6

Wavefront Aberration

Fig. 7

XY Cross-section

Fig. 8

XZ Cross-section

Fig. 9

Wavefront Aberration

Fig. 10

XY Cross-section

Fig. 11

XZ Cross-section

Fig. 12

Wavefront Aberration

Fig. 13

XY Cross-section

Fig. 14

XZ Cross-section

Fig. 15

Wavefront Aberration

Fig. 16

XY Cross-section

Fig. 17

XZ Cross-section

Fig. 18

Wavefront Aberration

Fig. 19

XY Cross-section

Fig. 20

XZ Cross-section

Fig. 21

Wavefront Aberration

Fig. 22

Wavefront Aberration

Without Decentration

Fig. 23

Wavefront Aberration

With Decentration

Fig. 24

Without Decentration

Fig. 25

Wavefront Aberration

With Decentration

LINEAR IMAGING LENS ELEMENT FOR A SCANNING OPTICAL SYSTEM

BACKGROUND OF THE INVENTION

1. Field of the Invention

The present invention relates to a linear imaging optical system in which light flux from a light source is formed as a linear image, and the light flux in the form of the liner image is made incident on a reflection surface of a light deflector in the optical scanning system.

2. Description of the Related Art

In a laser printer or other such scanning optical systems, in order to correct facet-error of a reflection surface of a polygon mirror (a light deflector), light flux from a light source is formed as a linear image, and the light flux in the form of the linear image is made incident on the light deflector for scanning. In such a scanning optical system, a linear image forming single lens element has been known. More concretely, a linear image forming single lens element is a single lens element having the collimating function for making diverging light flux from a light source parallel, and the function of a cylindrical lens element for forming a linear image. However, in a linear image forming single lens element of the prior art, the correcting of aberrations has disadvantageously been insufficient on cross-sections which are inclined with respect to the direction of the linear image and the direction perpendicular to the linear-image. It has also been known that a linear image forming single lens element of this type has conventionally employed an aspherical surface for the purpose of correcting various aberrations. A complex configuration of an aspherical surface could be designed to have sufficient optical performance; however, actual optical performance of the lens element is not always satisfactory due to production error, because such an aspherical surface has high decentering sensitivity.

SUMMARY OF THE INVENTION

It is an object of the present invention to provide a linear imaging lens element for a scanning optical system in which light flux from a light source is formed, in the vicinity of a reflection surface of a light deflector, as a linear image through which the correcting of aberrations on cross-sections, which are inclined with respect to the direction of the linear image and the direction perpendicular to the linear-image, can satisfactorily be made. Furthermore, yet another object of the present invention is to provide a linear imaging lens element which has low decentering sensitivity, so that even if production error exists, there is little deterioration in the optical performance thereof.

In order to attain the above-mentioned objects, there is provided a linear imaging lens element for a scanning optical system in which light flux from a light source is formed, in the vicinity of a reflection surface of a light deflector, as a linear image having (A) a progressive power toric-aspherical surface, provided on either a surface facing the light source or on a surface facing the deflector; wherein cross-sectional configurations, being parallel with the plane including the optical axis and being perpendicular to the linear image, are made to be a circular arc, and the radius of curvature of each circular arc cross-sectional configuration is independently determined from the cross-sectional configuration lain on the plane which includes the optical axis and is parallel with the linear image; and having (B), on the opposite surface of the progressive power toric-aspherical surface, at least one of, (b1) a spherical surface, (b2) a toric surface having an axis of rotation on the plane including the optical axis and being parallel with the linear image, (b3) a toric-aspherical surface having an axis of rotation on the plane including the optical axis and being parallel with the linear image, and the non-circular arc cross-sectional configuration on the defined plane, and (b4) a progressive power toric-aspherical surface which is the same as that of item (A).

An laser diode, which is generally used as a light source, has different beam divergence with respect to the directions perpendicular to each other. The direction of the linear image preferably coincides with the direction of the larger beam divergence.

A linear imaging lens element according to the present invention preferably satisfies the following condition when one surface thereof is a spherical surface:

$$-0.8 < ry1/ry2 < 0.3 \tag{1}$$

wherein:

$ry1$ designates the radius of curvature of the surface, facing the deflector, on the plane including the optical axis and being parallel with the linear image; and $ry2$ designates the radius of curvature of the surface, facing the light source, on the plane including the optical axis and being parallel with the linear image.

The present disclosure relates to subject matter contained in Japanese Patent Application No. 10-179910 (filed on Jun. 26, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
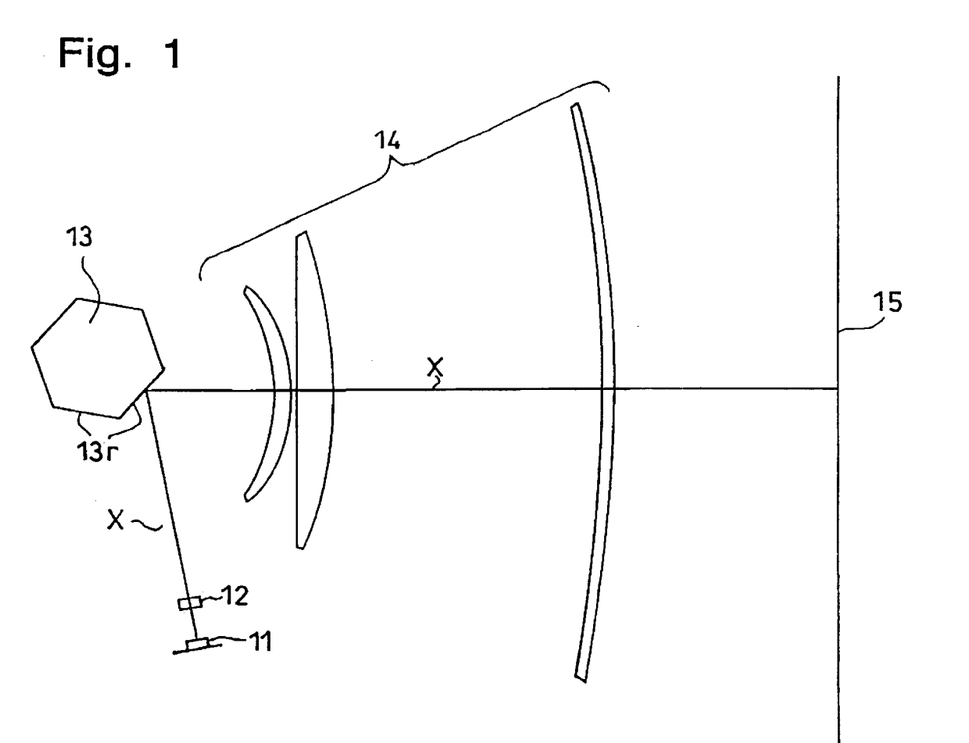
FIG. 1 is a plane view of an example of an optical scanning system according to the present invention.
Figure 2:
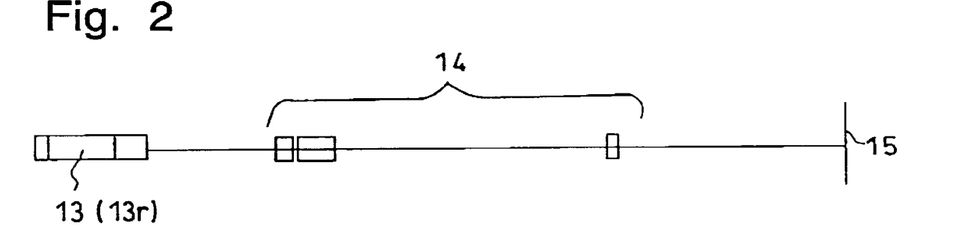
FIG. 2 is a side view of FIG. 1.

FIGS. 1 and 2 show an optical system of a laser beam printer as an example of a scanning optical system according to the present invention. Diverging light flux emitted from a laser diode (a light source) 11 forms a linear image in the vicinity of a reflection surface 13r of a polygon mirror 13 through a linear imaging single lens element 12. The light flux, which is reflected from the reflection surface 13r of the rotating polygon mirror 13, is made incident on a photosensitive drum 15 through an fθ lens 14, whereby a latent image according to the modulation of the light source 11 can be produced. Thereafter, the latent image is developed through the electrophotographic process per se known, and is transcribed onto a sheet of paper.

The linear imaging single lens element 12 has the collimating function for making diverging light flux from the light source 11 parallel, and the function of a cylindrical lens element for forming a linear image. As known in the art, the light source 11 emits light flux having non-circular cross-section in which beam divergence is different with respect to the directions perpendicular to each other, and the direction of the linear image coincides with the direction of the larger beam divergence. In the coordinate systems, the optical axis of the linear imaging single lens element 12 is defined as the x coordinate axis, the direction of the linear image is defined as the y coordinate axis, and the z coordinate axis is defined by the direction orthogonal to the coordinate axes x and y. The linear image extends in the x-y plane which includes the optical axis of the linear imaging single lens element 12 (the x coordinate axis) and is perpendicular to the axis of rotation of the polygon mirror 13; and the linear image is viewed as a point image in the x-z plane. It is known in the art that a linear image is arranged to be formed in the vicinity of a reflection surface 13r of the polygon mirror 13. Due to this arrangement, even if facet-error of each reflection surface 13r of the polygon mirror 13 exists, an adverse effect, attributable to the facet-error, of the photosensitive drum 15 can be corrected.

The present invention mainly relates to the linear imaging single lens element 12 of the above explained scanning optical system. The characteristics of the linear imaging single lens element 12 are as follows;

(A) On either a surface facing the light source or on a surface facing the deflector, there is provided an aspherical surface (referred to as a progressive power toric-aspherical surface), wherein cross-sectional configurations, being parallel with the plane including the optical axis and being perpendicular to the linear image (the x-z plane), are made to be a circular arc, and the radius of curvature of each circular arc cross-sectional configuration is independently determined from the cross-sectional configuration on the plane which includes the optical axis and is parallel with the linear image (the x-y plane); and (B) On the opposite surface of the progressive power toric-aspherical surface, at least one of the following surfaces is provided:

(b1) a spherical surface, (b2) a toric surface having an axis of rotation on the plane including the optical axis and being parallel with the linear image (the x-y plane), (b3) a toric surface having an axis of rotation on the plane including the optical axis and being parallel with the linear image (the x-y plane), and a non-circular arc cross-sectional configuration on the x-y plane, and (b4) a progressive power toric-aspherical surface (the same as that of item (A)) in which cross-sectional configuration, being parallel with the plane including the optical axis and perpendicular to the linear image (the x-z plane), are made to be a circular arc, and the radius of curvature of each circular arc cross-sectional configuration is independently determined from the cross-sectional configuration lain on the plane which includes the optical axis and is parallel with the linear image (the x-y plane).

Figure 3:
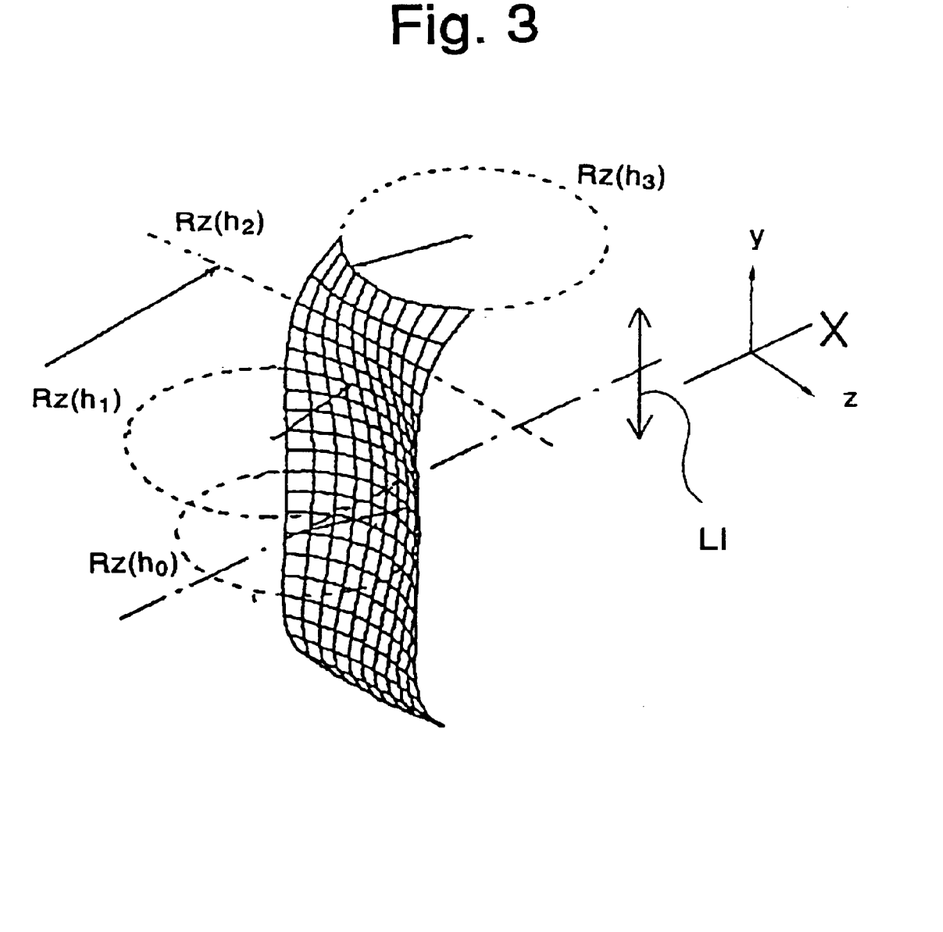
FIG. 3 is a conceptual view of a progressive power toric-aspherical surface.

FIG. 3 is a conceptual view of the progressive power toric-aspherical surface of the above item (A) or item (b4). In this drawing, the direction of the linear image L1 is also indicated. The cross-sectional configurations, being parallel with the x-z plane including the optical axis and being perpendicular to the linear image L1, are formed as circular arc Rz, and the radius of curvature Rz(i) of each circular arc cross-section is independently determined from the cross-sectional configuration on the x-y plane which includes the x coordinate axis (the optical axis) and is parallel with the linear image. In other words, in the progressive power toric-aspherical surface, the radius of curvature on the x-z plane is independently determined from the cross-sectional configurations on the x-y plane, which means that the progressive power toric-aspherical surface is an aspherical surface having no axis of rotation.

Each embodiment will be discussed. In the tables, ry designates the radius of curvature on the x-y plane, rz designates the radius of curvature on the x-z plane [mm] (in the case of the progressive power toric-aspherical surface, the radius of curvature on the optical axis), d designates the lens thickness or distance, n designates the refractive index with respected to the wave length used. The surface numbers are counted from the side of the polygon mirror 13.

The progressive power toric-aspherical surface shown in FIG. 3 is defined in the following formulae (1 and 2).

$$x = cy^2/\{1+[(1+K)c^2y^2]^{1/2}\} + A4y^4 + A6y^6 + A8y^8 + A10y^{10} \ldots \text{[formula 1]}$$

wherein x designates a distance from a tangent plane of an aspherical vertex;

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient;
A10 designates a tenth-order aspherical coefficient.

$$1/rz = (1/rz0) + B1y + B2y^2 + B3y^3 + B4y)^4 + \ldots \quad \text{[formula 2]}$$

wherein
rz designates the radius of curvature of the circular arc cross-sectional configuration on the x-z plane; and
rz0 designates the radius of curvature of the circular arc cross-sectional configuration at the optical axis;
Bi(i=1,2,3,4,...) designates the curvature coefficients of the x-y plane.

The progressive power toric-aspherical surface is formed by the non circular arc cross-sectional configuration on the x-y plane (defined by formula 1), and the circular arcs Rz defined by formula 2 are arranged to follow the non circular arc cross-sectional configuration on the x-y plane.

The progressive power toric-aspherical surface can also be defined as follows: cross-sectional configurations, being parallel with the plane including the optical axis and being perpendicular to the linear image (the x-z plane), are made to be a circular arc, and a line connecting each center of curvature of each circular arc cross-sectional configuration is curved in the plane including the optical axis and being parallel with the linear image.

Embodiment 1

Figure 4:
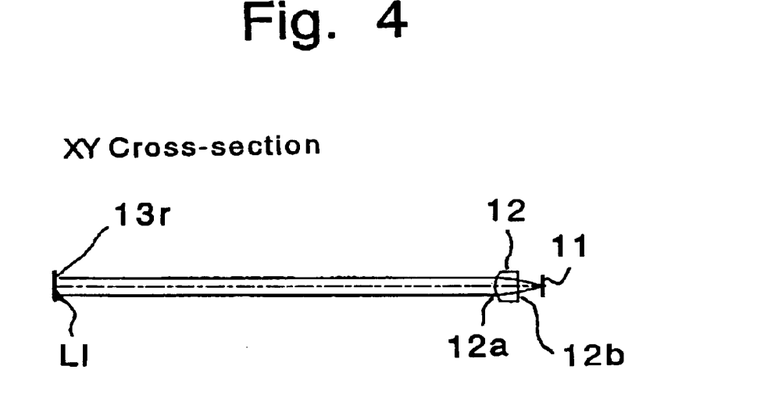
FIG. 4 shows a plan view of a linear imaging single lens element according to the first embodiment of the present invention.
Figure 5:
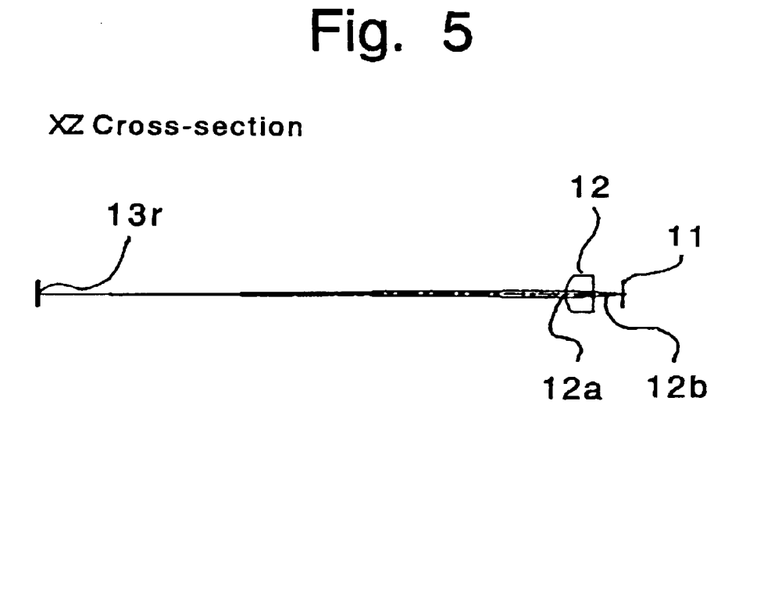
FIG. 5 is a side view of FIG. 4.
Figure 6:
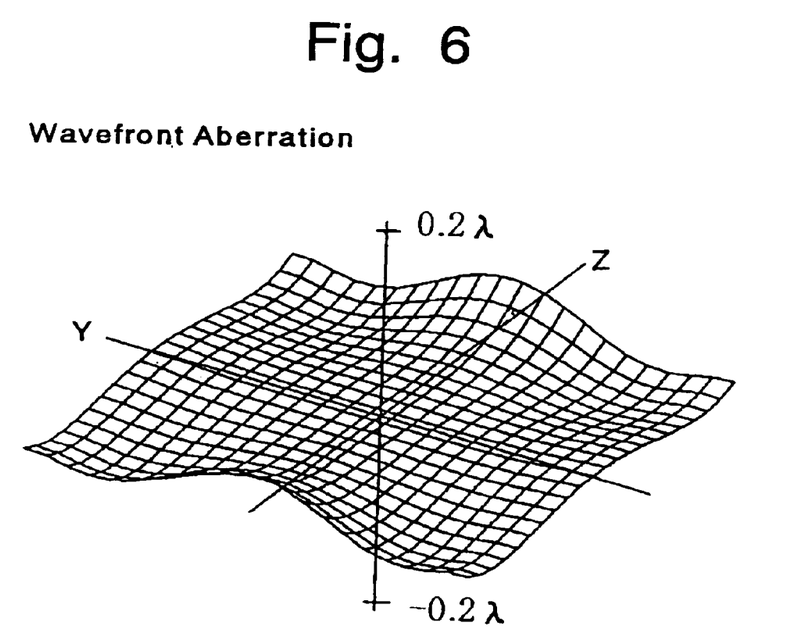
FIG. 6 shows wavefront aberrations of the linear imaging single lens element shown in FIG. 4.

FIGS. 4 through 6 and Table 1 show the first embodiment of the linear image single lens element 12 according to the present invention.
[Table 1]
(i) A focal length on the x-y plane $f_{xy}=10.0$
(ii) Magnification on the x-z plane $m_{xz}=-0.07$
(iii) The distance from the linear image to the emission surface 12a (the first surface)=100.00
(iv) The distance from the light emission point of the light source 11 to the incident surface 12b (the second surface)=6.83 (including the thickness 0.25 mm of the glass cover of the light source 11)
(v) Wave length used=780 nm

| (vi) Surface No. | ry | rz | d | n |
|---|---|---|---|---|
| 1* | 7.260 | 6.57 | 5.80 | 1.68821 |
| 2 | −89.140 | | | |

The symbol "*" (surface No. 1) designates the progressive power toric-aspherical surface. Surface No. 2 is the spherical surface.

The aspherical surface data for the progressive power toric-aspherical surface (surface No. 1) is as follows:
K=−0.289
A4=−1.13×10$^{-4}$
A6=−1.60×10$^{-6}$
A8=−3.68×10$^{-8}$
A10=0.0
B1=0.0
B2=2.97×10$^{-4}$
B3=0.0
B4=5.92×10$^{-5}$
B5=0.0
B6=−5.09×10$^{-6}$ As shown in FIG. 6, wavefront aberrations of the first embodiment are satisfactorily corrected. Here, it should be noted that the wavefront aberration diagram shows a case where light is made incident from the side of the linear image so that a point image is formed. The same is applied to other wavefront aberration diagrams.

Embodiment 2

Figure 7:
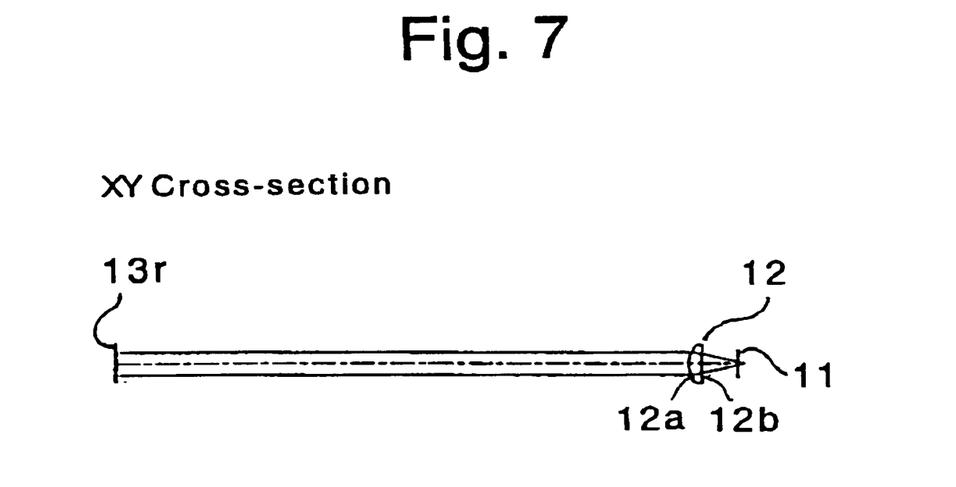
FIG. 7 shows a plan view of a linear imaging single lens element according to the second embodiment of the present invention.
Figure 8:
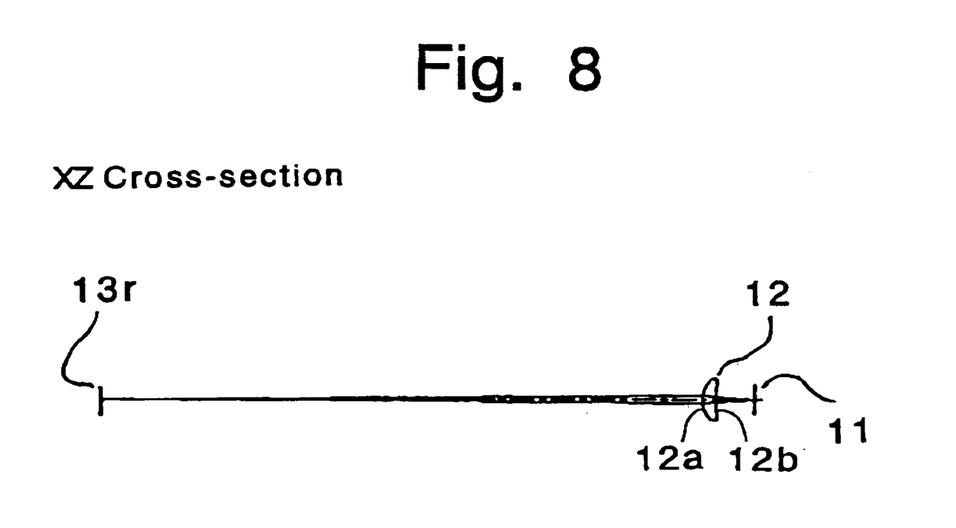
FIG. 8 is a side view of FIG. 7.
Figure 9:
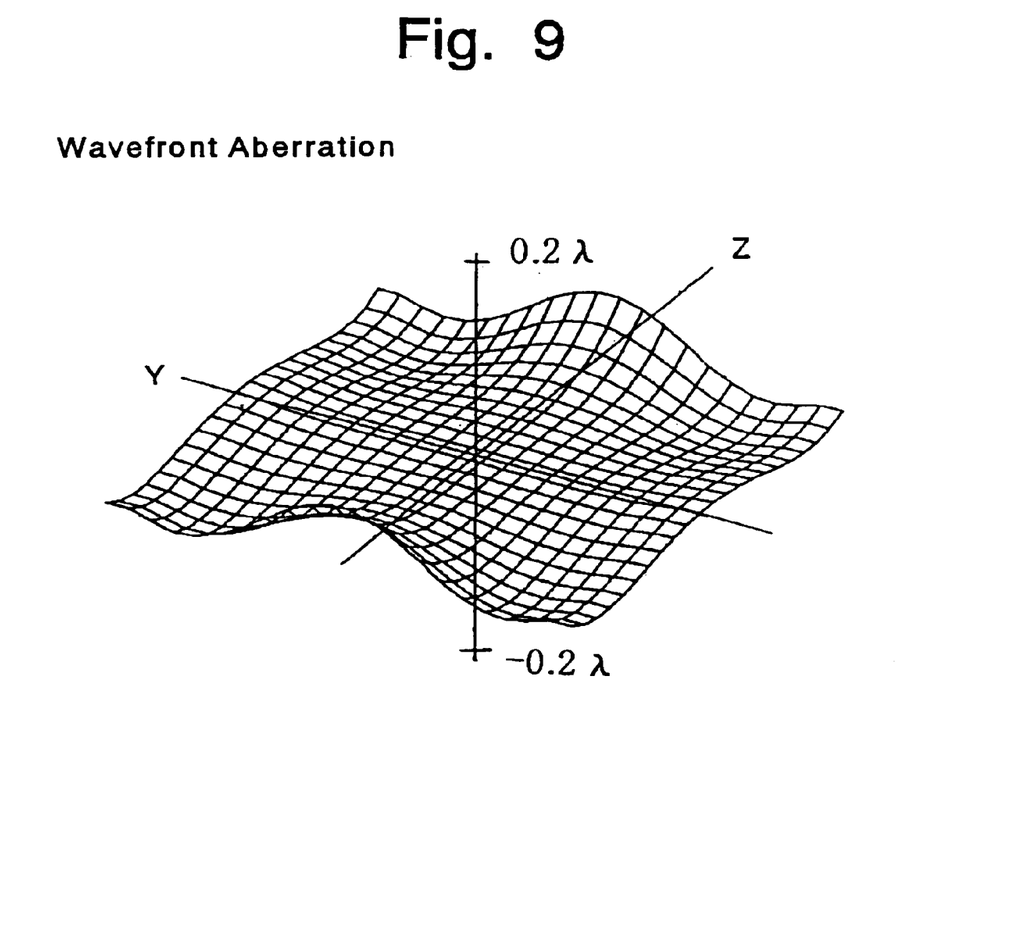
FIG. 9 shows wavefront aberrations of the linear imaging single lens element shown in FIG. 7.

FIGS. 7 through 9 and Table 2 show the second embodiment of the linear image single lens element 12 according to the present invention.
[Table 2]
(i) A focal length on the x-y plane $f_{xy}=10.0$
(ii) Magnification on the x-z plane $m_{xz}=-0.07$
(iii) The distance from the linear image to the emission surface 12a (the first surface)=100.00
(iv) The distance from the light emission point of the light source 11 to the incident surface 12b (the second surface)=8.52 (including the thickness 0.25 mm of the glass cover of the light source 11)
(v) Wave length used=780 nm

| (vi) Surface No. | ry | rz | d | n |
|---|---|---|---|---|
| 1* | 6.740 | 6.14 | 2.59 | 1.68821 |
| 2 | 275.520 | | | |

The symbol "*" (surface No. 1) designates the progressive power toric-aspherical surface. Surface No. 2 is the spherical surface.

The aspherical surface data for the progressive power toric-aspherical surface (surface No. 1) is as follows:
K=−0.287
A4=−1.17×10$^{-4}$
A6=−1.61×10$^{-6}$
A8=−5.65×10$^{-8}$
A10=0.0
B1=0.0
B2=4.58×10$^{-4}$
B3=0.0
B4=8.12×10$^{-5}$
B5=0.0
B6=−6.67×10$^{-6}$ As shown in FIG. 9, wavefront aberrations of the second embodiment are satisfactorily corrected.

Embodiment 3

Figure 10:
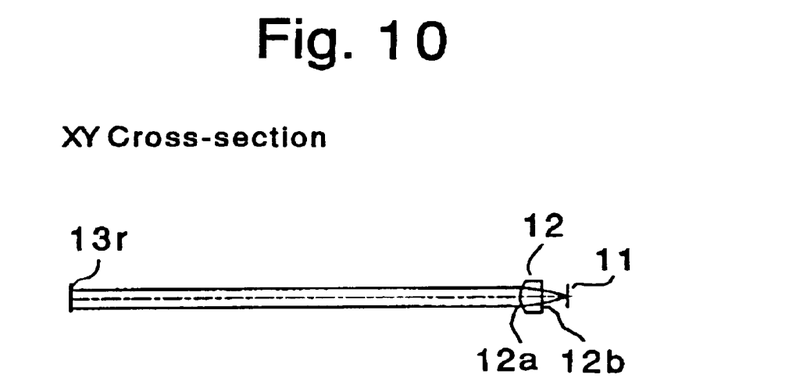
FIG. 10 shows a plan view of a linear imaging single lens element according to the third embodiment of the present invention.
Figure 11:
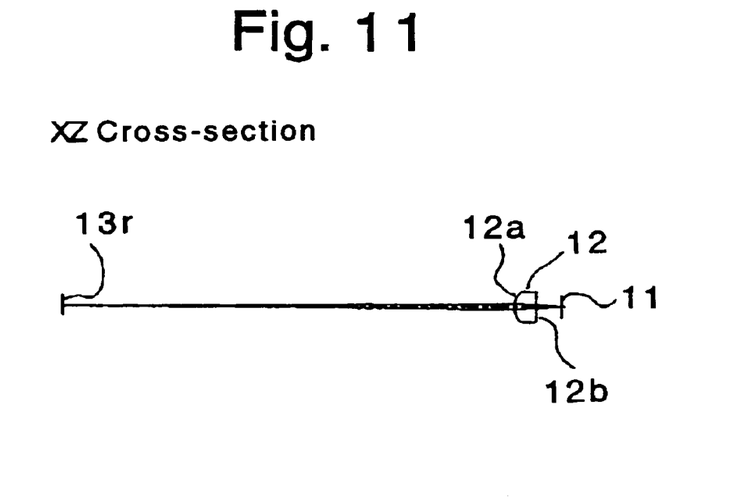
FIG. 11 is a side view of FIG. 10.
Figure 12:
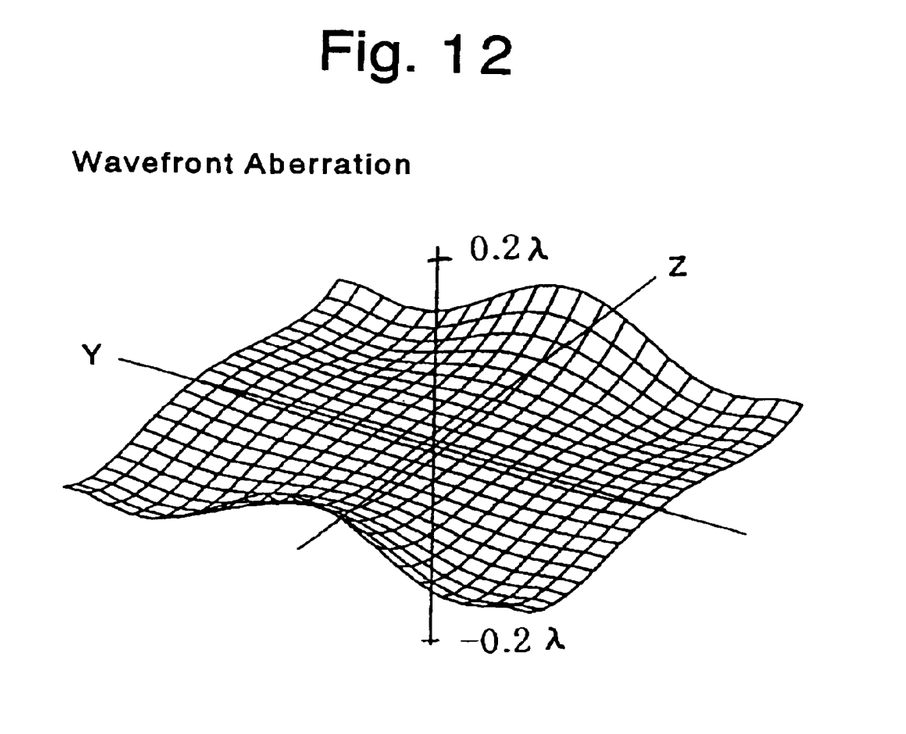
FIG. 12 shows wavefront aberrations of the linear imaging single lens shown in FIG. 10.

FIGS. 10 through 12 and Table 3 show the third embodiment of the linear image single lens element 12 according to the present invention.
[Table 3]
(i) A focal length on the x-y plane $f_{xy}=10.0$
(ii) Magnification on the x-z plane $m_{xz}=-0.07$
(iii) The distance from the linear image to the emission surface 12a (the first surface)=100.00

(iv) The distance from the light emission point of the light source 11 to the incident surface 12b (the second surface)=6.97 (including the thickness 0.25 mm of the glass cover of the light source 11)
(v) Wave length used=780 nm

| (vi) Surface No. | ry | rz | d | n |
|---|---|---|---|---|
| 1* | 7.190 | 6.51 | 5.50 | 1.68821 |
| 2 | −110.550 | | | |

The symbol "*" (surface No. 1) designates the progressive power toric-aspherical surface. Surface No. 2 is the spherical surface.
The aspherical surface data for the progressive power toric-aspherical surface (surface No. 1) is as follows:
K=−0.286
A4=−1.14×10$^{-4}$
A6=−1.54×10$^{-6}$
A8=−4.36−10$^{-8}$
A10=0.0
B1=0.0
B2=2.66×10$^{-4}$
B3=0.0
B4=7.66×10$^{-5}$
B5=0.0
B6=−6.54×10$^{-6}$ As shown in FIG. 12, wavefront aberrations of the third embodiment are satisfactorily corrected.

Embodiment 4

Figure 13:
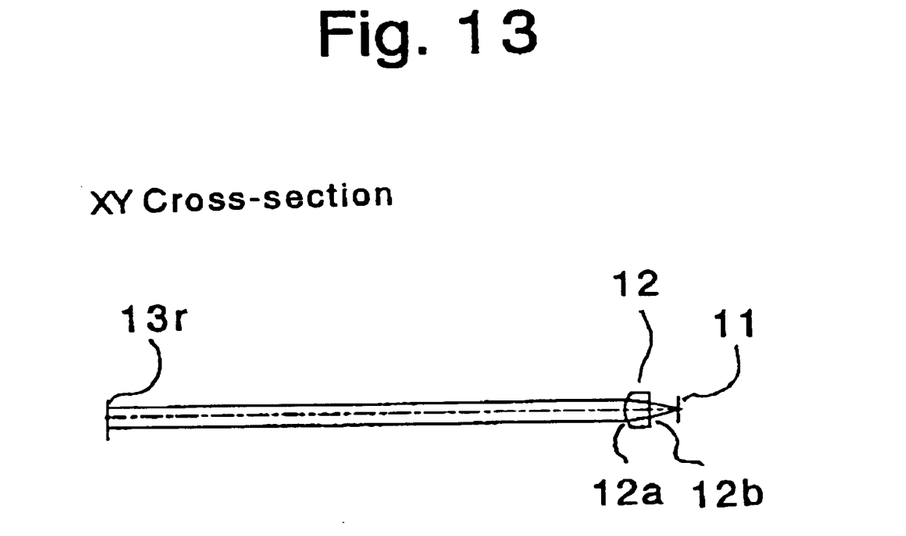
FIG. 13 shows a plan view of a linear imaging single lens element according to the fourth embodiment of the present invention.
Figure 14:
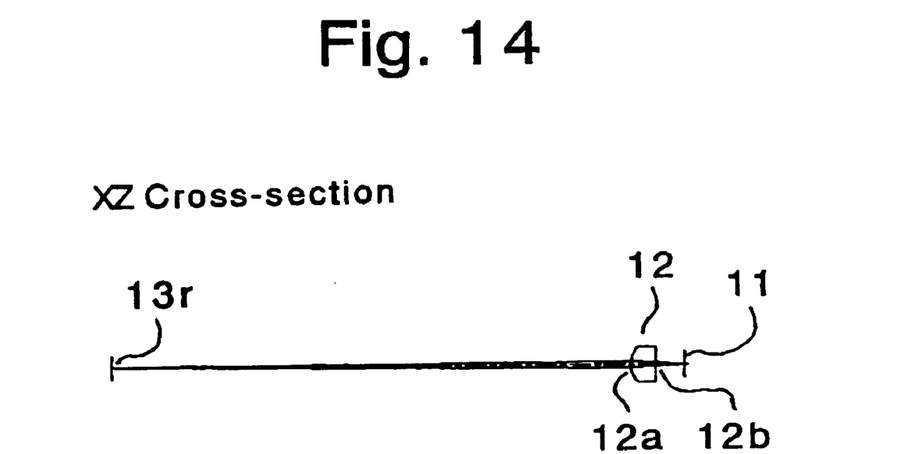
FIG. 14 is side view of FIG. 13.
Figure 15:
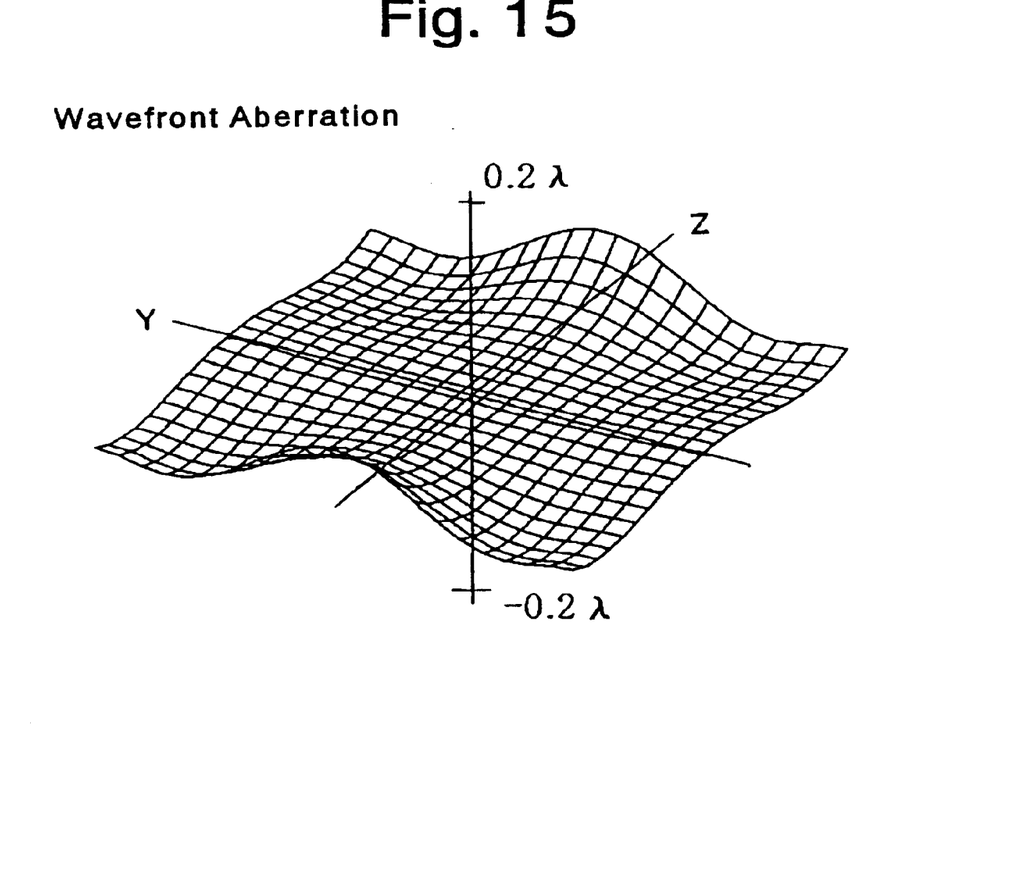
FIG. 15 shows wavefront aberrations of the linear imaging single lens element shown in FIG. 13.

FIGS. 13 through 15 and Table 4 show the fourth embodiment of a linear image single lens element 12 according to the present invention.
[Table 4]
(i) A focal length on the x-y plane $f_{xy}$=10.0
(ii) magnification on the x-z plane $m_{xz}$=−0.07
(iii) The distance from the linear image to the emission surface 12a (the first surface)=100.00
(iv) The distance from the light emission point of the light source 11 to the incident surface 12b (the second surface)=6.96 (including the thickness 0.25 mm of the glass cover of the light source 11)
(v) Wave length used=780 nm

| (vi) Surface No. | ry | rz | d | n |
|---|---|---|---|---|
| 1* | 7.180 | 6.42 | 5.50 | 1.68821 |
| 2 | −114.050 | −217.48 | | |

The symbol "*" (surface No. 1) designates the progressive power toric-aspherical surface. Surface No. 2 is the toric surface having an axis of rotation on the x-y plane.
The aspherical surface data for the progressive power toric-aspherical surface (surface No. 1) is as follows:
K=−0.381
A4=−8.08×10$^{-5}$
A6=−1.39×10$^{-6}$
A8=−1.48×10$^{-8}$
A10=0.0
B1=0.0
B2=3.13×10$^{-4}$
B3=0.0
B4=7.14×10$^{-5}$
B5=0.0
B6=−5.75×10$^{-6}$ As shown in FIG. 15, wavefront aberrations of the fourth embodiment are satisfactorily corrected.

Embodiment 5

Figure 16:
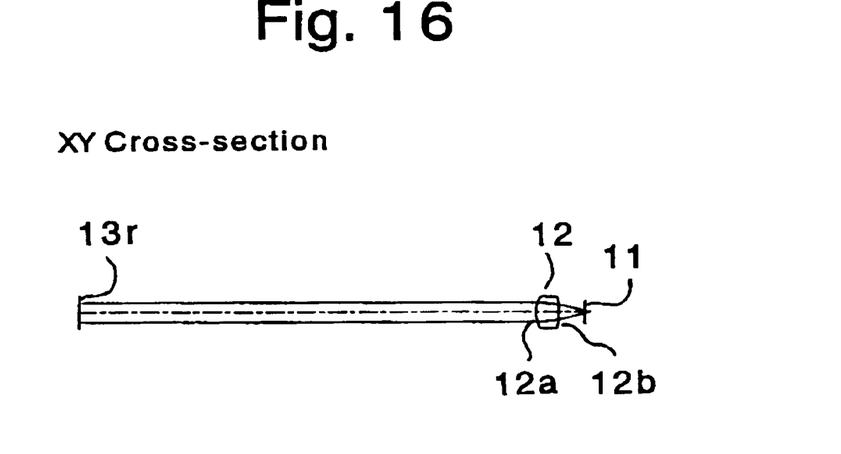
FIG. 16 shows a plan view of a linear imaging single lens element according to the fifth embodiment of the present invention.
Figure 17:
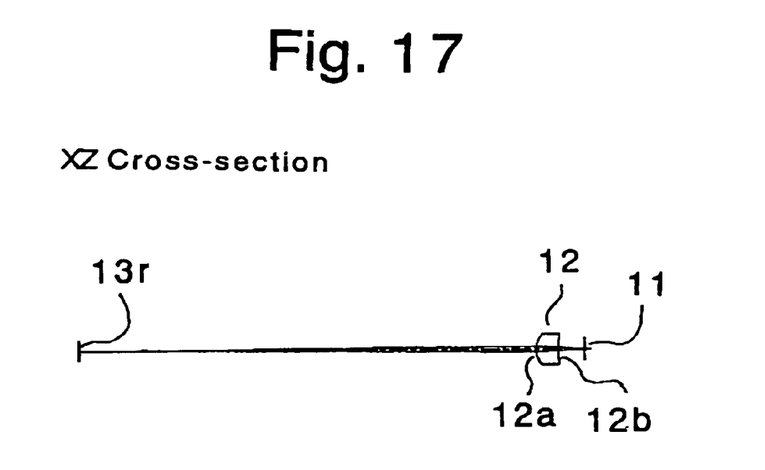
FIG. 17 is side view of FIG. 16.
Figure 18:
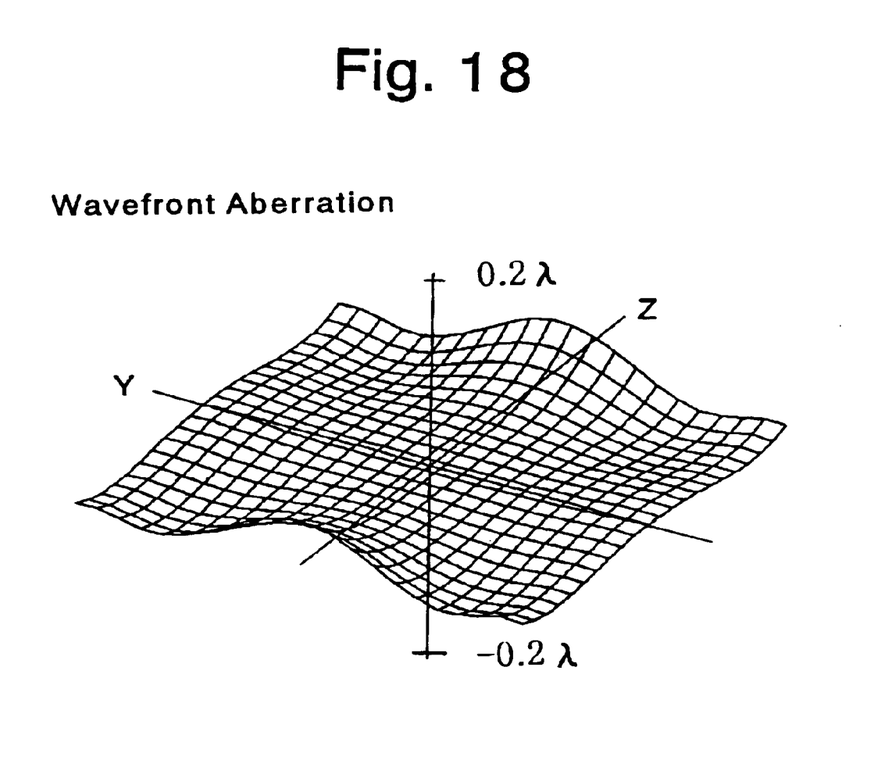
FIG. 18 shows wavefront aberrations of the linear imaging single lens element shown in FIG. 16.

FIGS. 16 through 18 and Table 5 show a fifth embodiment of a linear image single lens element 12 according to the present invention.
[Table 5]
(i) A focal length on the x-y plane $f^{xy}$=10.0
(ii) Magnification on the x-z plane $m^{xz}$=−0.07
(iii) The distance from the linear image to the emission surface 12a (the first surface)=100.00
(iv) The distance from the light emission point of the light source 11 to the incident surface 12b (the second surface)=7.55 (including the thickness 0.25 mm of the glass cover of the light source 11)
(v) Wave length used 780 nm

| (vi) Surface No. | ry | rz | d | n |
|---|---|---|---|---|
| 1* | 8.830 | 6.63 | 5.50 | 1.68821 |
| 2** | −23.280 | 644.75 | | |

The symbol "*" (surface No. 1) designates the progressive power toric-aspherical surface. The symbol "**" (surface No. 2) designates the toric-aspherical surface having an axis of rotation on the x-y plane on which a non circular arc cross-sectional configuration defined by formula 1 is made; and the axis of rotation is perpendicular to the x coordinate axis.
The aspherical surface data for the progressive power toric-aspherical surface (surface No. 1) is as follows:
K=−−0.884
A4=−1.71×10$^{-4}$
A6=−5.66×10$^{-6}$
A8=−1.77×10$^{-7}$
A10=0.0
B1=0.0
B2=−5.87×10$^{-6}$
B3=0.0
B4=6.15×10$^{-5}$
B5=0.0
B6=−6.52×10$^{-6}$ The aspherical surface data for the toric-aspherical surface (surface No. 2) is as follows:
K=0.0
A4=−3.17×10$^{-4}$
A6=−6.45×10$^{-6}$
A8=−1.45×10$^{-7}$
A10=0.0

As shown in FIG. 18, wavefront aberrations of the fifth embodiment are satisfactorily corrected.

Embodiment 6

Figure 19:
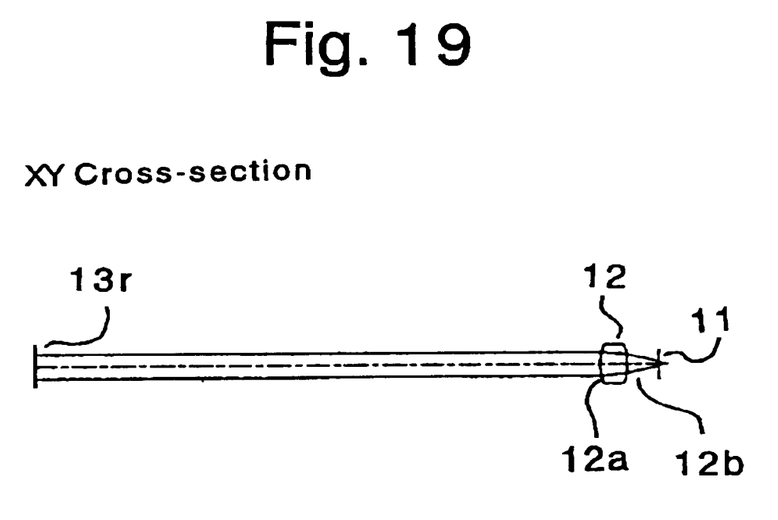
FIG. 19 shows a plan view of a linear imaging single lens element according to the sixth embodiment of the present invention.
Figure 20:
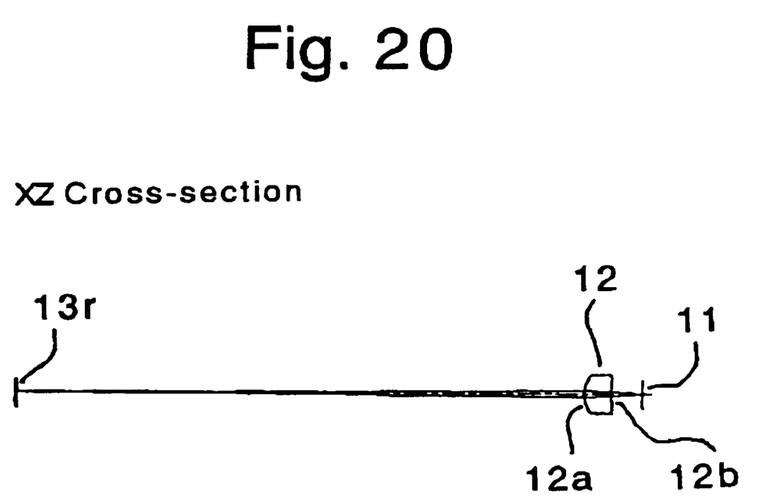
FIG. 20 is a side view of FIG. 19.
Figure 21:
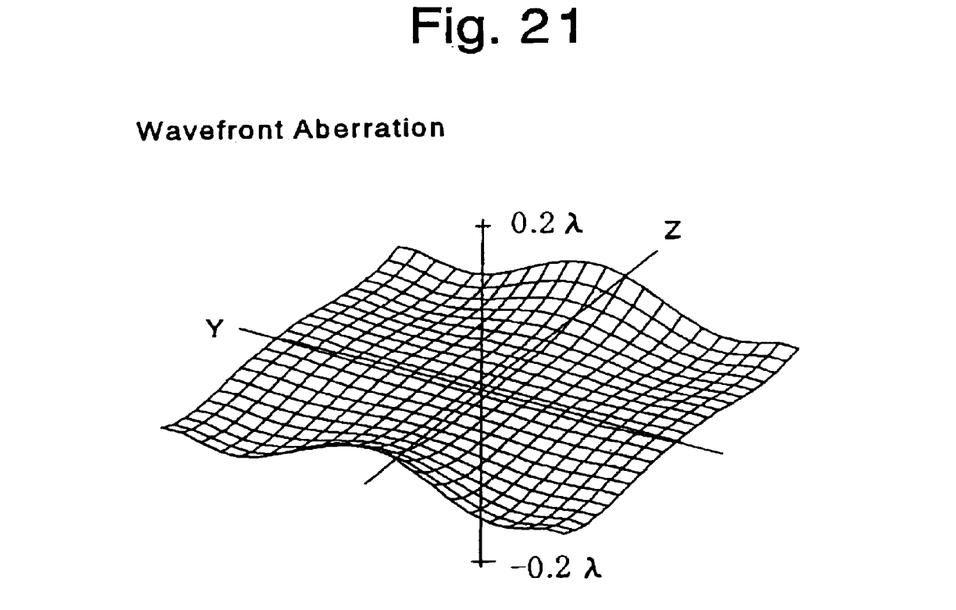
FIG. 21 shows wavefront aberrations of the linear imaging single lens element shown in FIG. 19.

FIGS. 19 through 21 and Table 6 show the sixth embodiment of a linear image single lens element 12 according to the present invention.
[Table 6]
(i) A focal length on the x-y plane $f_{xy}$=10.0
(ii) magnification on the x-z plane $m_{xz}$=−0.07
(iii) The distance from the linear image to the emission surface 12a (the first surface)=100.00
(iv) The distance from the light emission point of the light source 11 to the incident surface 12b (the second surface)=7.98 (including the thickness 0.25 mm of the glass cover of the light-source 11)
(v) Wave length used=780 nm

| (vi) Surface No. | ry | rz | d | n |
|---|---|---|---|---|
| 1* | 10.640 | 6.78 | 5.50 | 1.68821 |
| 2* | −15.380 | 186.84 | | |

The symbol "*" (surfaces 1 and 2) designates the progressive power toric-aspherical surfaces.

The aspherical surface data for the progressive power toric-aspherical surface (surface No. 1) is as follows:
K=−0.877
$A4=-3.61\times10^{-4}$
$A6=-9.64\times10^{-6}$
$A8=-2.75\times10^{-7}$
A10=0.0
B1=0.0
$B2=1.07\times10^{-4}$
B3=0.0
$B4=3.98\times10^{-5}$
B5=0.0
$B6=-4.36\times10^{-6}$ The aspherical surface data for the progressive power toric-aspherical surface (surface No. 2) is as follows:
R=0.000
$A4=-4.21\times10^{-4}$
$A6=-8.13\times10^{-6}$
$A8=-6.90\times10^{-8}$
A10=0.0
B1=0.0
$B2=9.27\times10^{-4}$
B3=0.0
$B4=-7.89\times10^{-5}$
B5=0.0
$B6=9.79\times10^{-6}$ As shown in FIG. 21, wavefront aberrations of the sixth embodiment are satisfactorily corrected.

Figure 22:
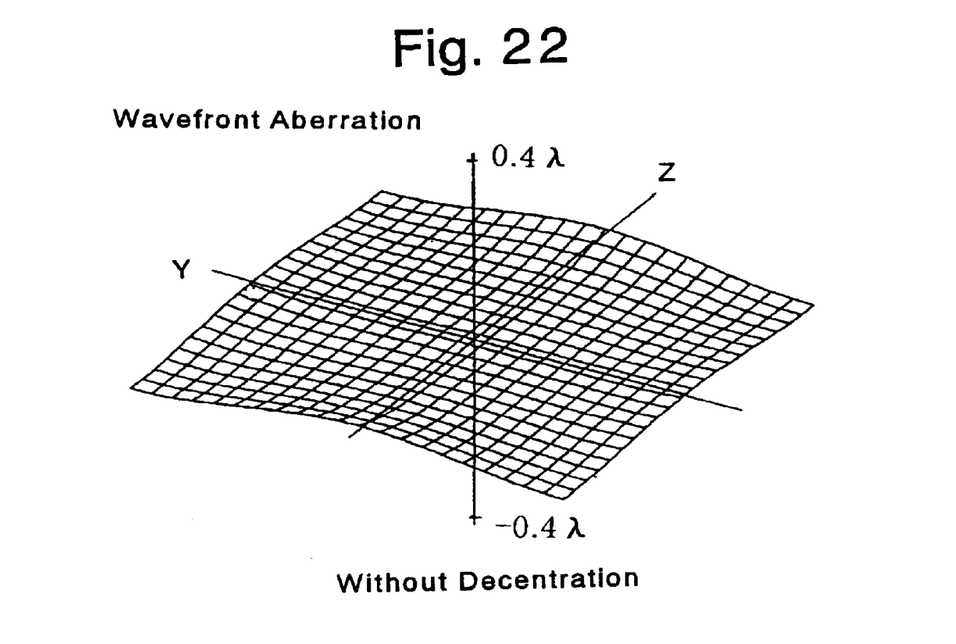
FIG. 22 shows wavefront aberrations when no decentering exists in the linear imaging single lens element of the first embodiment.
Figure 23:
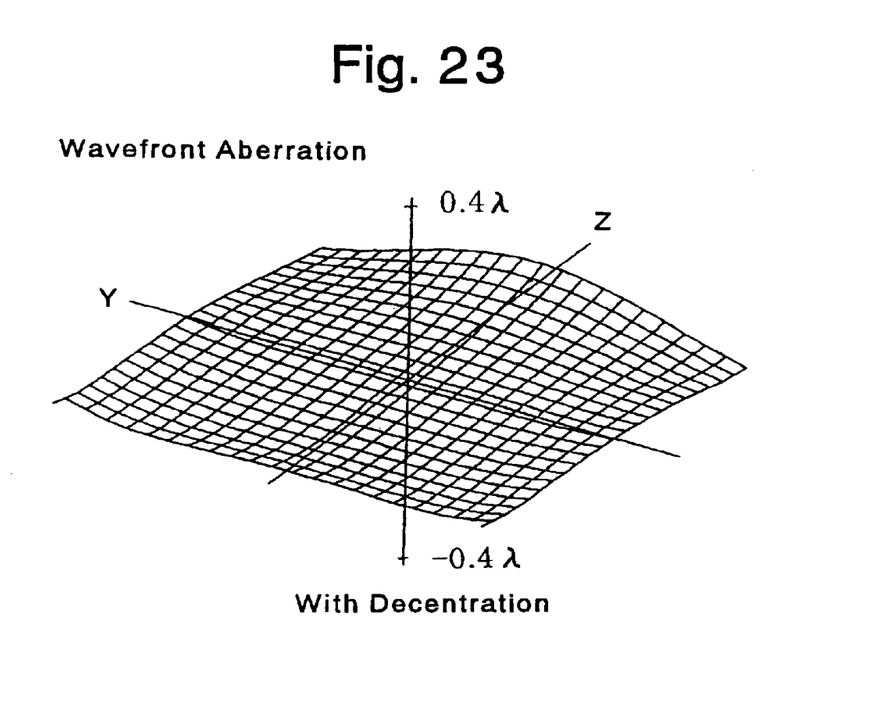
FIG. 23 shows wavefront aberrations when decentering exists in the linear imaging single lens element of the first embodiment.
Figure 24:
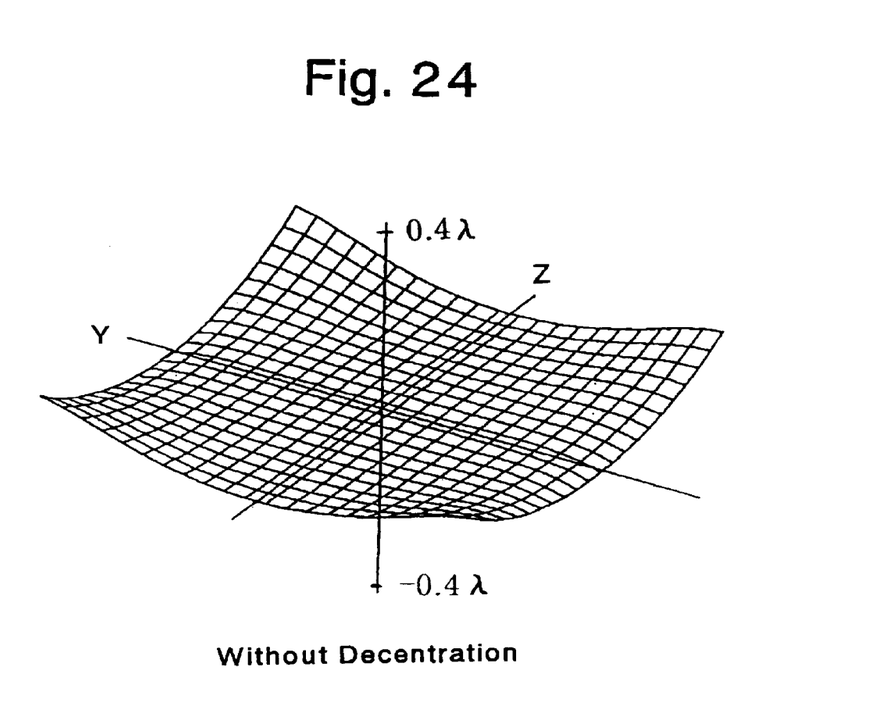
FIG. 24 shows wavefront aberrations of a comparative example of a linear imaging single lens element when no decentering exists.
Figure 25:
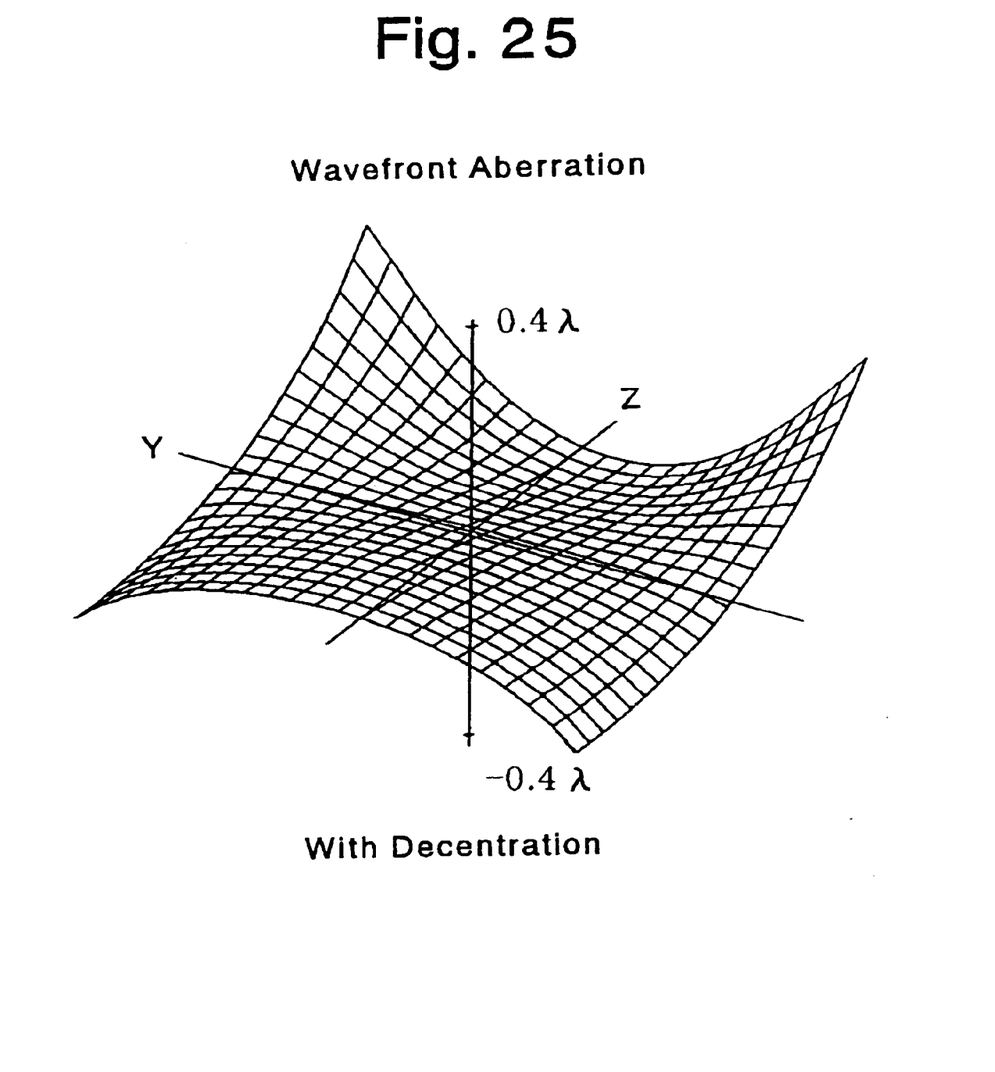
FIG. 25 shows wavefront aberrations of the comparative example of the linear imaging single lens element of FIG. 24 when decentering exists.

FIGS. 22 through 25 show wavefront aberration diagrams, based on the first embodiment and a comparative example, through which decentering sensitivity is discussed. FIG. 22 shows the first embodiment without decentering (the first embodiment: the linear imaging single lens element 12 having the light source side surface on which the spherical surface is formed, and the deflector side surface on which the progressive power toric-aspherical surface is formed). FIG. 23 shows the first embodiment with decentering. When these FIGS. 22 and 23 are compared, it becomes apparent that only a little deterioration of wavefront aberration is observed, which means that decentering sensitivity is low in the first embodiment. On the other hand, FIGS. 24 and 25 show the linear imaging single lens element 12, without or with decentering, in which the surface facing the light source is an aspherical surface which is symmetrical with respect to the optical axis, and the surface facing the deflector is a toric surface having an axis of rotation on the x-y plane including the optical axis and being parallel with the linear image. Under the condition that the amount of decentering of FIG. 25 is the same as that of FIG. 23, wavefront aberrations of FIG. 24 (without decentering) is larger than those of FIG. 22 (without decentering); moreover, deterioration of wavefront aberrations of FIG. 25 (with decentering) is worse than those of FIG. 23 (with decentering). Due to these results, it is understood that the linear imaging single lens element 12 shown in FIGS. 24 and 25 has large decentering sensitivity.

According to the present invention, a linear imaging lens element for a scanning optical system in which light flux from a light source is formed, in the vicinity of a reflection surface of a light deflector, as a linear image can sufficiently correct aberrations on cross-sections, which are inclined with respect to the linear image and the direction perpendicular to the linear-image. Furthermore, the linear imaging lens element of the present invention has low decentering sensitivity, so that even if production error exists, there is little deterioration in the optical performance thereof.

What is claimed is:

1. A linear imaging lens element for a scanning optical system in which light flux from a light source is formed as a linear image in the vicinity of a reflection surface of a light deflector, said linear imaging lens element comprising:

a progressive power toric-aspherical surface provided on one of a surface facing the light source and a surface facing the reflector;

wherein cross-sectional configurations of said progressive power toric-aspherical surface, which are parallel with the plane including the optical axis and perpendicular to the linear image, comprise a circular arc, and a radius of curvature of each said circular arc cross-sectional configuration is independently determined from the cross-sectional configuration on the plane which includes the optical axis and is parallel to the linear image.

2. The linear imaging lens element according to claim 1, further comprising:

a spherical surface being provided on the opposite surface of said progressive power toric-aspherical surface.

3. The linear imaging lens element according to claim 1, further comprising:

a toric surface being provided on the opposite surface of said progressive power toric-aspherical surface;

wherein said toric surface has an axis of rotation on the plane including the optical axis and being parallel with said liner image.

4. The linear imaging lens element according to claim 1, further comprising:

a toric-aspherical surface being provided on the opposite surface of said progressive power toric-aspherical surface;

wherein said toric-aspherical surface has an axis of rotation on the plane including the optical axis and being parallel with said linear image; and wherein a cross-sectional configuration of said toric-aspherical surface on said plane including the optical axis and being parallel with said linear image is a non-circular arc.

5. The linear imaging lens element according to claim 1, wherein said progressive power toric-aspherical surface is provided on both surfaces of said linear imaging lens element.

6. The linear imaging lens element according to claim 1, wherein said light source comprises an laser diode having different beam divergence with respect to the directions perpendicular to each other, and wherein the direction of said linear image coincides with the direction of a larger beam divergence.

7. The linear imaging lens element according to claim 2, wherein said linear imaging lens element satisfies the following condition:

$$-0.8 < ry1/ry2 < 0.3$$

wherein:

ry1 designates the radius of curvature of the surface, facing said deflector, on the plane including the optical axis and being parallel with said linear image; and ry2 designates the radius of curvature of the surface, facing said light source, on the plane including the optical axis and being parallel with said linear image.

* * * * *